United States Patent [19]

Michler et al.

[11] Patent Number: 4,762,538
[45] Date of Patent: Aug. 9, 1988

[54] SPRAY ABSORBER AND METHOD OF OPERATING

[75] Inventors: Wilhelm Michler, Frankfurt; Hans W. Both, Schwalbach; Rolf Keppler, Frankfurt, all of Fed. Rep. of Germany

[73] Assignee: Metallgesellschaft AG, Frankfurt am Main, Fed. Rep. of Germany

[21] Appl. No.: 82,756

[22] Filed: Aug. 6, 1987

[30] Foreign Application Priority Data

Aug. 8, 1986 [DE] Fed. Rep. of Germany ....... 3626919

[51] Int. Cl.⁴ .............................................. B01D 47/16
[52] U.S. Cl. .......................................... 55/84; 55/230; 261/84; 159/4.2; 159/DIG. 41
[58] Field of Search ...................... 55/84, 230; 261/84; 159/4.02, 4.2, 4.3, DIG. 41, DIG. 42, 48.1

[56] References Cited

U.S. PATENT DOCUMENTS

| | | | |
|---|---|---|---|
| 2,574,705 | 11/1951 | Peebles | 159/4.2 |
| 3,128,320 | 4/1964 | Umbricht | 55/230 |
| 3,463,400 | 8/1969 | Miller et al. | 159/4.2 |
| 4,481,171 | 11/1984 | Baran et al. | 159/4.02 |
| 4,584,000 | 4/1986 | Guest | 159/4.2 |

*Primary Examiner*—Tim Miles
*Attorney, Agent, or Firm*—Karl F. Ross; Herbert Dubno

[57] ABSTRACT

A spray absorber in which a rotary sprayer is centrally disposed adjacent to the top is provided with a cover cap which is adapted to be raised and is laterally pivotally movable and adapted to close the shaft opening for the rotary sprayer when the latter must be replaced without an interruption of the gas flow.

9 Claims, 3 Drawing Sheets

SPRAY ABSORBER AND METHOD OF OPERATING

FIELD OF THE INVENTION

Our present invention relates to a spray absorber and, more particularly, to a spray absorber of the type in which a suspension of an absorbing particulate in a liquid is dispersed into a flow or stream of gas from which a substance is to be absorbed, the gas is then discharged and the powder can collect in a bin at the bottom of the absorber. Particularly, the invention relates to an absorber of the type which requires removal or replacement of a rotary sprayer without entry of ambient air into the absorber or loss of gas therefrom.

BACKGROUND OF THE INVENTION

A spray absorber for the purposes described generally comprises a cylindrical housing having a tubular gas inlet port at its top, a shaft terminating in a rotary sprayer extending coaxially downwardly through the gas inlet port for dispersing the suspensions of the absorbing solid in the liquid, a gas guiding structure which directs the downward flow of gas into interaction with the spray, a bin for collecting pulverulent material at the bottom of the housing, and a tubular gas outlet located above the material in the bin for discharging gas from the housing.

Spray absorbers of this type can be used to remove substances from exhaust gases by absorption, the liquid of the spray being atomized and then vaporized by the heat of the exhaust gas treated.

The suspension is distributed in the gas stream by a rotary spray nozzle, utilizing centrifugal force.

Owing to erosion of the sprayer by the erosive action of the suspension, the rotary sprayers must be replaced from time to time.

In some cases, the replacement of the rotary sprayer need not result in an interruption of flow of gas through the housing since that flow can be accomplished under a negative or subatmospheric pressure so that there will be no danger of escape of the gas into the environment.

However, there are cases when communication between the atmosphere and the housing, upon replacement of the sprayer, may create a problem.

One such case is where ambient air cannot be allowed to enter the housing because the gas therein is a combustible which can form an explosive mixture with any ambient air which may be drawn into the housing by the subatmospheric pressure.

For safety reasons, moreover, the flow of gas through the housing may have to be interrupted when, in prior art systems, the rotary sprayer is to be replaced. These cases include situations in which the exhaust gas is very hot or contains toxic components and there is a danger, even at a subatmospheric pressure, of some escape because, for example, of brief pressure fluctuations which frequently arise in gas handling systems.

OBJECTS OF THE INVENTION

It is thus the principal object of the present invention to provide a spray absorber of the type described, but which is free from danger of escape of gas to the atmosphere or undesired aspiration of ambient air into the housing.

Another object of this invention is to provide a method of operating the spray absorber such that replacement of the rotary sprayer is possible without interruption of gas flow through the absorber.

SUMMARY OF THE INVENTION

These objects and others which will become apparent hereinafter are attained, in accordance with the present invention, in a spray absorber for treating a gas stream with a suspension of an absorbent in a liquid which comprises the cylindrical housing previously described, the means forming the tubular gas inlet port opening downwardly into the housing and having a downwardly open shaft for discharging a rotating spray of the suspension into the housing and gas guiding means in the housing concentric to the sprayer as described.

According to the invention, a cover is provided and is constructed and arranged to fit over the shaft from below and thereby form a cap which can close the shaft and permit removal and replacement of the sprayer therethrough.

Actuating means is operatively connected to the cover cap for raising the cover cap into closing engagement with the shaft, lowering the cover cap to unblock the shaft, and for swinging the cover cap laterally out of alignment with the shaft.

According to a feature of the invention, the housing is provided at its top with a niche in which the cover cap can be parked when it is laterally swung out of alignment with the shaft.

The parking niche which is disposed adjacent the top outside of the gas flow space can include a channel which is adapted to receive an arm of the actuating means carrying the cap.

The actuating means can thus include a vertical rod which is guided so as to be vertically displaceable linearly and so as to be rotatable about its axis to effect the swinging movement of the cover cap, and an arm connected at one end to the rod and carrying the cap at its other end.

The arm is receivable in the aforementioned channel and may be provided with a sheet metal cover element which closes the channel when the cap and the arm are parked in the niche and channel.

A stuffing box bearing may seal the top of the housing around the rod where the rod extends into the gas flow space.

BRIEF DESCRIPTION OF THE DRAWING

The above objects, features and advantages of our invention will become more readily apparent from the following description, reference being made to the accompanying drawing in which.

SPECIFIC DESCRIPTION

Figure 1:
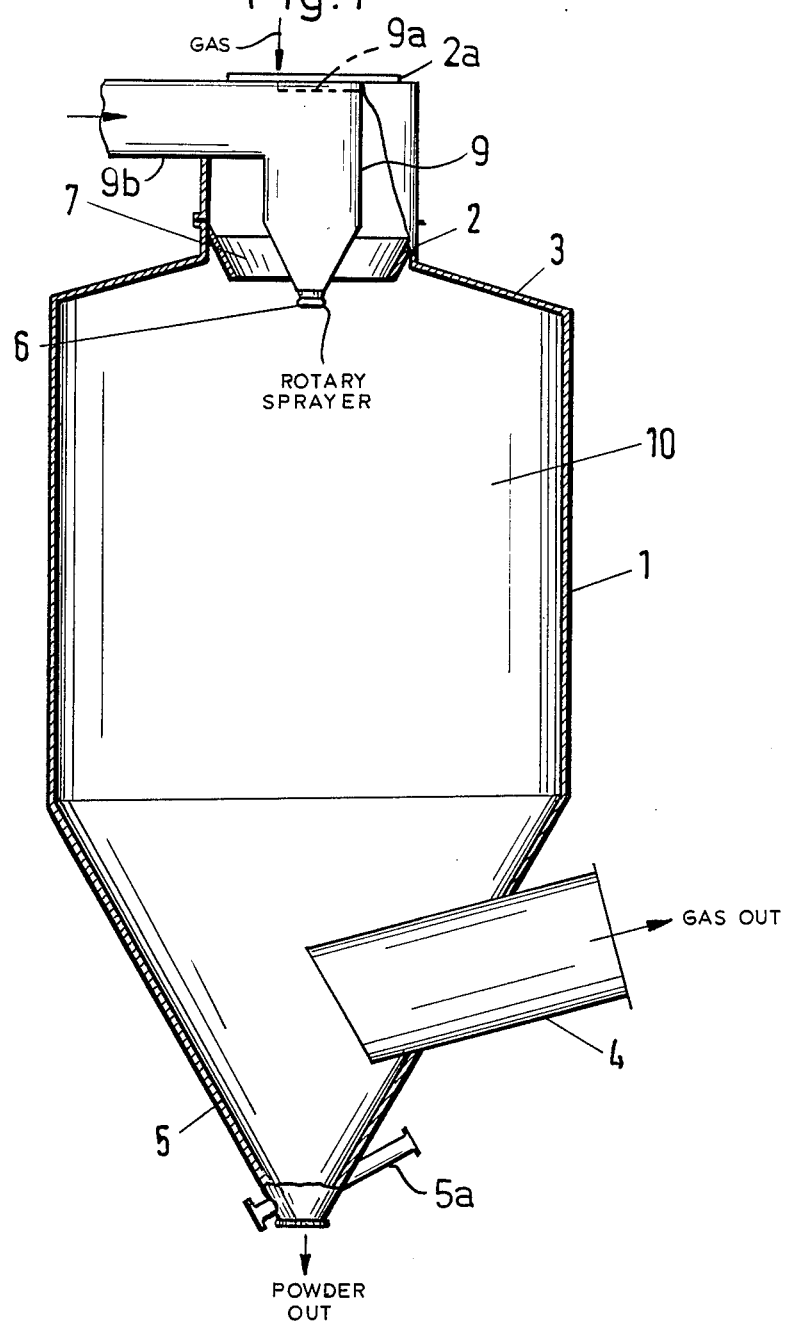
FIG. 1 is a vertical section through a prior art sprayer absorber whose housing and other parts can also form parts of the absorber of the invention.

The spray absorber shown in FIG. 1 comprises a housing 1 having a top 3 formed with a tubular gas inlet port 2 connected at 2a to the flue gas inlet of a plant for the combustion of a fuel producing a hot exhaust gas.

Along the bottom of the housing 1 is provided a dust-collecting bin 5 which can be closed by means not shown and formed with fittings 5a for introducing a loosening gas into this bin for discharging the powder which collects therein.

Above the collected powder in the bin a tubular gas outlet port 4 can be provided and can be connected to a stack and, if desired, means for further purifying the gas and means for generating a subatmospheric pressure in the gas flow space 10 of the housing 1, the housing 1 contains a rotary sprayer in a vertical shaft 9 which can be provided with a hatch 9a removable to permit withdrawal of the rotary sprayer, the shaft 9 having an inlet 9b for the suspension.

Concentric to this centrally arranged rotary sprayer 6 is a gas guide means or baffle 7.

In normal operation of the apparatus, the gas to be cleaned enters the gas flow space 10 downwardly from above through the tubular inlet port 2. The gas guide 7 and sprayer 6 ensure an optimum mixing of the absorbent suspension atomized by the rotary sprayer 6 with the gas.

A material exchange occurs in the gas flow space 10 so that impurities in the gas are absorbed on the particles of the suspension before the gas is discharged from the port 4. Since the liquid of the suspension can be entirely evaporated during the intimate contact, a powder containing the impurities is collected in the bin 5 and can be removed continuously or from time to time.

According to the invention, (see FIGS. 2, 2A and 3) when the rotary sprayer 6 is replaced the opening of shaft 9 is closed to prevent the formation of a passage between the gas flow space and the environment.

The cover is in the form of a downwardly converging cover cap 8 which can be raised and lowered and swung laterally out of alignment with the shaft 9.

The actuating means for moving the cover cap 8 includes an arm 12 which covers the cover cap at one end and is connected rigidly at its other end to a vertical rod 14.

The vertical rod 14 is guided axially for vertical movement of arrow 14a in a tubular structure 17 mounted on the top 3 adjacent the inlet port 2. Bearings 14b permits this axial movement and are designed also to allow rotary movement of the rod by a servomotor 14c, as represented by the arrow 14d. The servomotor for axially displacing the rod is shown at 14e.

A stuffing box bearing 15 seals around the rod 14 in the region at which the rod passes through the top 3 of the housing.

Figure 2:
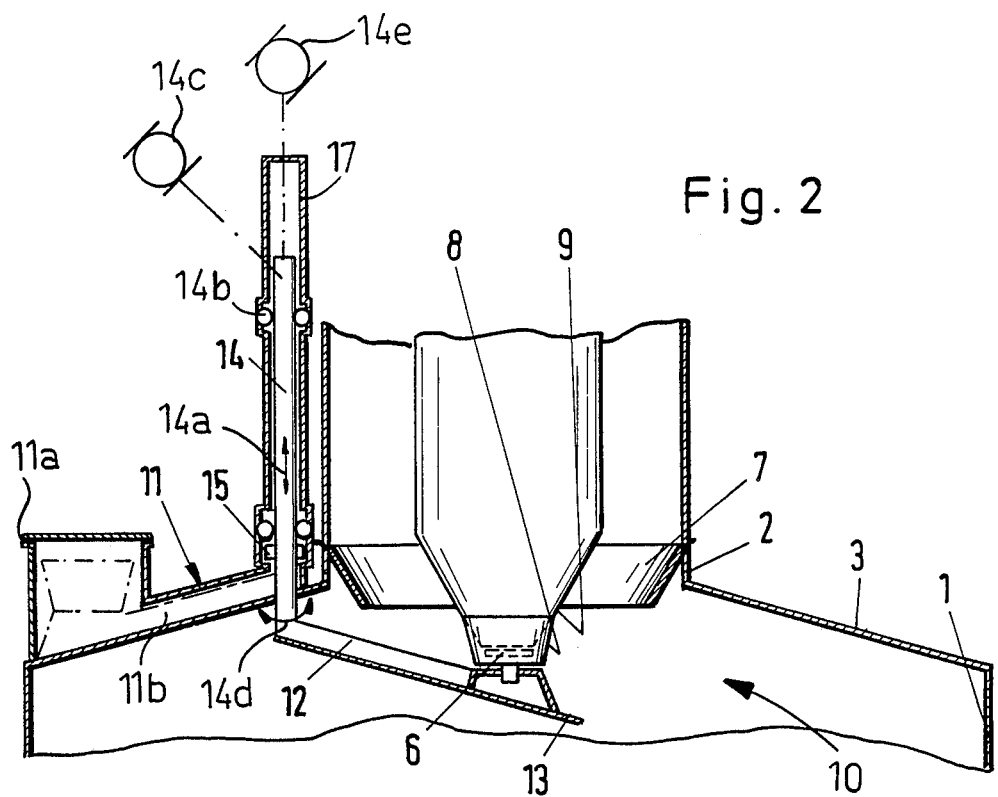
FIG. 2 is a cross-sectional view drawn to a larger scale than FIG. 1 of the actuating means, cover cap and associated parts of the spray absorber of the invention whose remaining structure can correspond to that of FIG. 1.
Figure 2A:
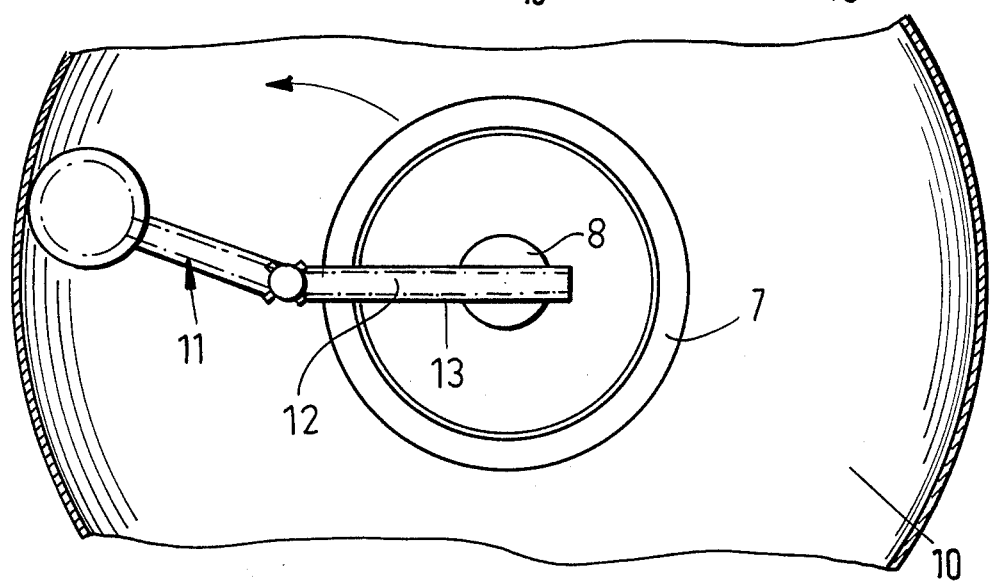
FIG. 2A is a transverse section through the housing illustrating the actuating means and the parking niche from below.
Figure 3:
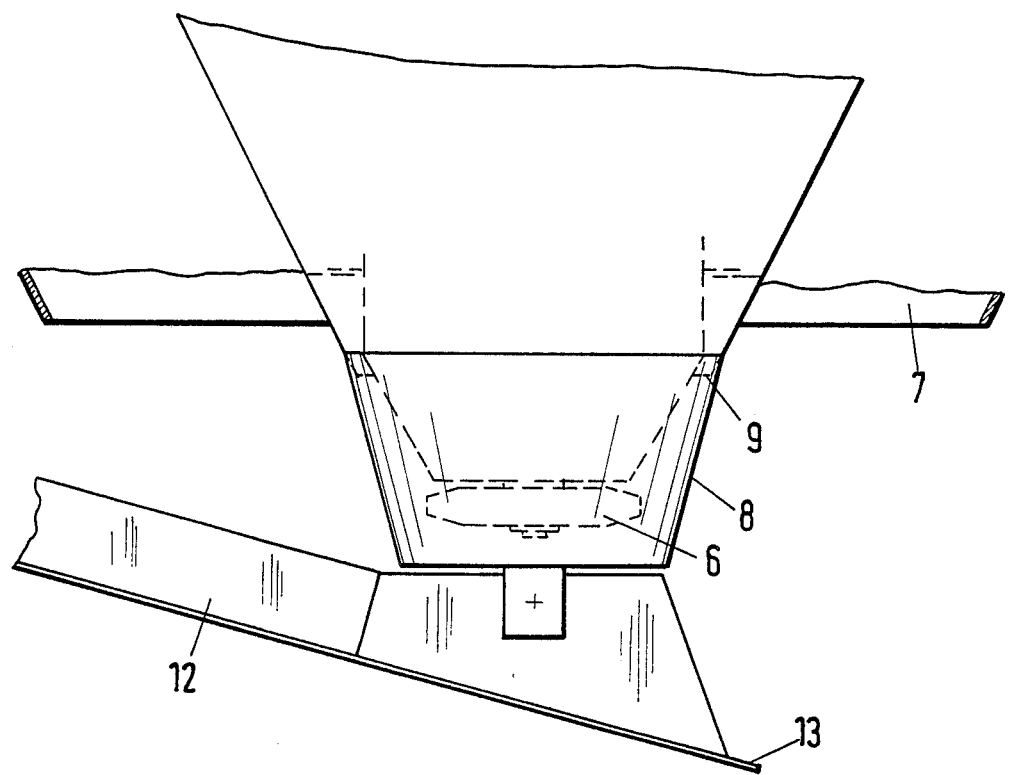
FIG. 3 is a view of the cap in elevation representing a detailed view of the relationship of the cap to the sprayer in the embodiment of FIG. 2.

The top of the housing is also provided with a parking niche generally represented at 11 and including a circular pocket 11a for receiving the cap 8 and a channel 11b for receiving the arm 12 as shown in dot-dash lines in FIG. 2.

During normal operations the cover cap is received in the parking niche 11 when replacement of the rotary sprayer 6 is not desired. In this position, a sheet metal element 13 secured to the carrying arm 12 can close the channel and the pocket 11a.

When it is desired to replace the rotary sprayer, however, the rod 14 is first displaced downwardly to lower the cap 8, is then rotated to bring the cap into alignment with the bottom end of the shaft 9, is then raised to bring the cover up into sealing relationship over the rotary sprayer 6 and against the bottom end of the shaft 9 and the rotary sprayer is replaced.

Once the rotary sprayer has been replaced, the cap 8 is lowered to clear the rotary sprayer and then is swung laterally into alignment with the niche 11 before being raised into that niche.

Sealing means can be provided at the upper edge of the cover cap so that an absolutely gas tight seal can be achieved by the application of a suitable pressing force thereto via the actuating means 12, 14. However, such a seal is not always necessary if the cover cap is carefully mounted and aligned with the shaft before it is raised into engagement therewith.

Since the cover cap and actuating means represent low cost items, their use has made a major contribution to improvements in spray absorbers which hitherto had to operate with a communication between the gas flow space and atmosphere during change of the rotary sprayer.

We claim:

1. A spray absorber for treating a gas stream with a suspension of an absorbent in a liquid, comprising:
    a cylindrical housing having an upright axis, a top extending transversely to said axis and closing said housing at an upper part thereof, and means forming a dust-collecting bin at a bottom of said housing;
    means forming a tubular gas inlet port opening downwardly into said housing at said top along said axis for introducing said gas stream axially downwardly into said housing;
    a rotary sprayer centrally disposed in said housing adjacent said top and having a downwardly open shaft for discharging a rotating spray of said suspension of said adsorbent in said liquid into said housing;
    gas-guiding means in said housing concentric to said sprayer for directing said gas flow through a gas flow space in said housing below said shaft and inducing intimate contact between said gas stream and said suspension whereby a pulverulent solid collects in said bin;
    means forming a tubular gas outlet port communicating with said housing above pulverulent solids collecting in said bin for discharging gas treated with said suspension;
    a cover constructed and arranged to fit over said shaft from below to close said shaft and permit removal and replacement of said sprayer therethrough; and
    actuating means operatively connected to said cover for raising said cover into closing engagement with said shaft and lowering said cover to unblock said shaft and for swinging said cover laterally out of alignment with said shaft.

2. The spray absorber defined in claim 1, further comprising means forming a parking niche dimensioned to receive said cover and said actuating means in said top outside of said gas flow space, said actuating means being constructed and arranged to shift said cover into said parking niche upon lateral swinging of said cover out of alignment with said shaft.

3. The spray absorber defined in claim 2 wherein said actuating means includes:

a generally transverse arm carrying said cover at one end of said arm;

a vertical rod connected to said arm at an opposite end thereof;

means for vertically guiding said rod axially for raising and lowering of said arm and said cover; and means for angularly displacing said rod about a longitudinal axis thereof to swing said arm and said cover laterally.

4. The spray absorber defined in claim 3 wherein said arm is provided with a sheet metal element covering said niche when said cover is disposed therein.

5. The spray absorber defined in claim 4 wherein said niche has a channel receiving said arm.

6. The spray absorber defined in claim 3 wherein said means for vertically guiding said rod axially for raising and lowering of said arm and said cover includes guide elements located outside said space and said housing, further comprising a stuffing box surrounding said rod at said top and sealing same where said rod extends through said top into said space.

7. The spray absorber defined in claim 6 wherein said guide elements are located proximal to said inlet port and said niche includes a recess for receiving said cover located proximal to an outer periphery of said top.

8. In a method of operating a spray absorber for treating a gas stream with a suspension of an adsorbent in a liquid, comprising the steps of:

(a) introducing said gas stream axially downwardly through a tubular inlet port into a cylindrical housing having an upright axis, a top extending transversely to said axis and traversed by said inlet port;

(b) dispersing said suspension of said adsorbent in said liquid into said gas stream through a rotary sprayer centrally disposed in said housing and having a downwardly open shaft for discharging a rotating spray of said suspension of said adsorbent in said liquid into said housing;

(c) directing said gas flow through a gas flow space in said housing below said shaft with gas-guiding means in said housing concentric to said sprayer for inducing intimate contact between said gas stream and said suspension whereby a pulverulent solid collects in a bin formed below said housing; and (d) discharging gas treated with said suspension from a tubular gas outlet port communicating with said housing above pulverulent solids collecting in said bin, the improvement which comprises the steps of:

(I) for replacement of said sprayer, swinging a cover laterally into alignment with said shaft from below, and raising said cover to close said shaft from below;

(II) replacing said sprayer through said shaft from above while said shaft is closed from below by said cover and said gas flow continues to be present in said gas flow space; and (III) thereafter lowering said cover to unblock said shaft and laterally swinging said cover out of axial alignment with said shaft.

9. The improvement defined in claim 8, further comprising the step of:

(IV) raising said cover into a niche formed in said top of said housing upon laterally swinging said cover out of axial alignment with said shaft.

* * * * *